Feb. 11, 1936.   I. T. SKILES   2,030,077
REFUSE CATCHING AND REMOVING DEVICE FOR FLOORS
Filed Jan. 30, 1933   3 Sheets-Sheet 1

INVENTOR
IRA T. SKILES
BY
ATTORNEY

Feb. 11, 1936.   I. T. SKILES   2,030,077
REFUSE CATCHING AND REMOVING DEVICE FOR FLOORS
Filed Jan. 30, 1933   3 Sheets-Sheet 2
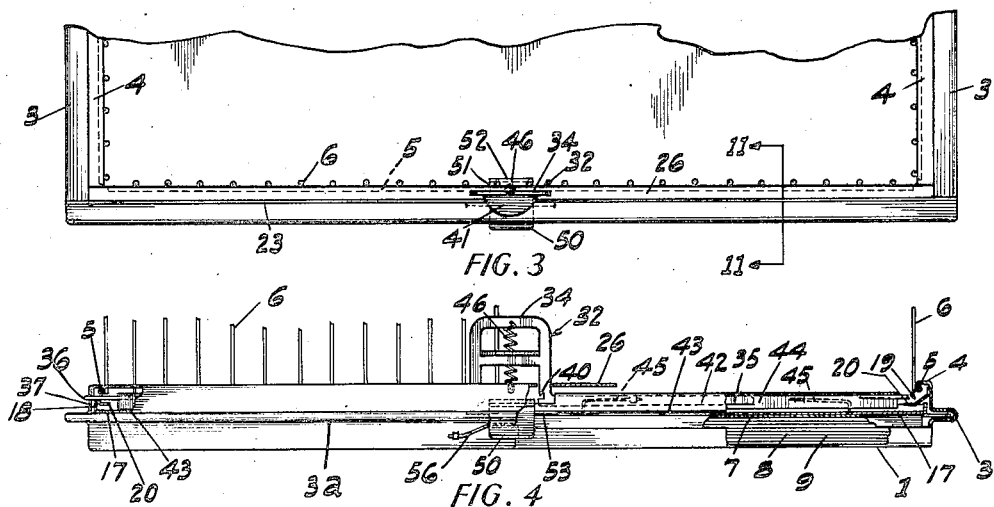
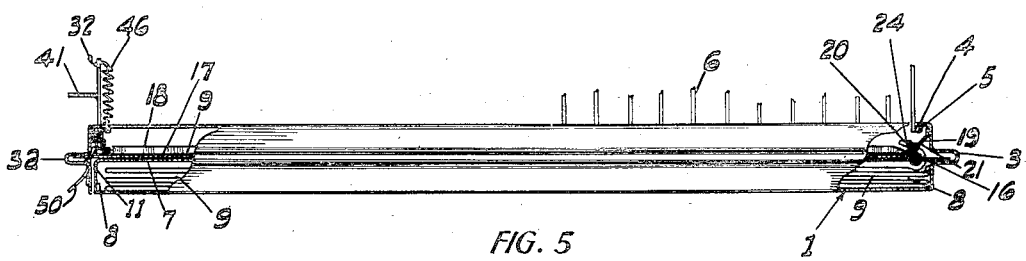
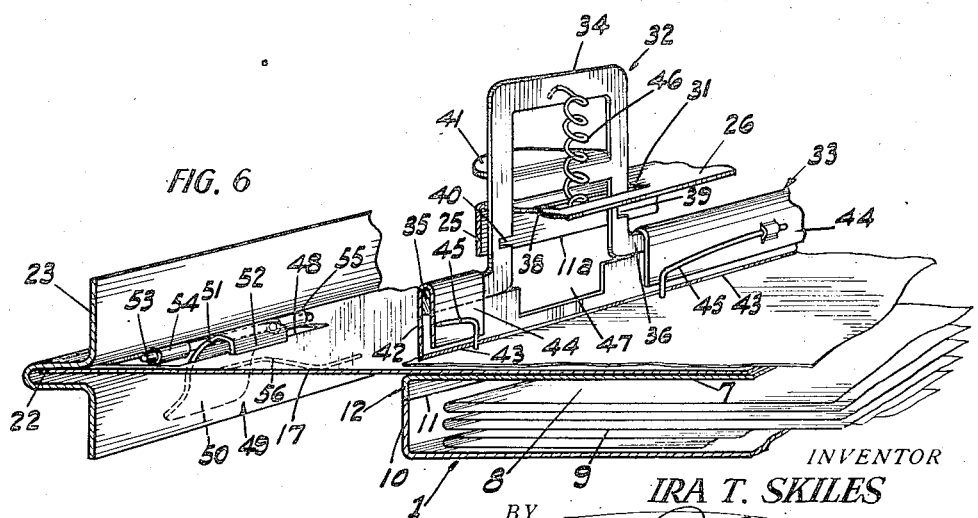
INVENTOR
IRA T. SKILES
BY
ATTORNEY Feb. 11, 1936.　　　　I. T. SKILES　　　　2,030,077
REFUSE CATCHING AND REMOVING DEVICE FOR FLOORS
Filed Jan. 30, 1933　　　3 Sheets-Sheet 3
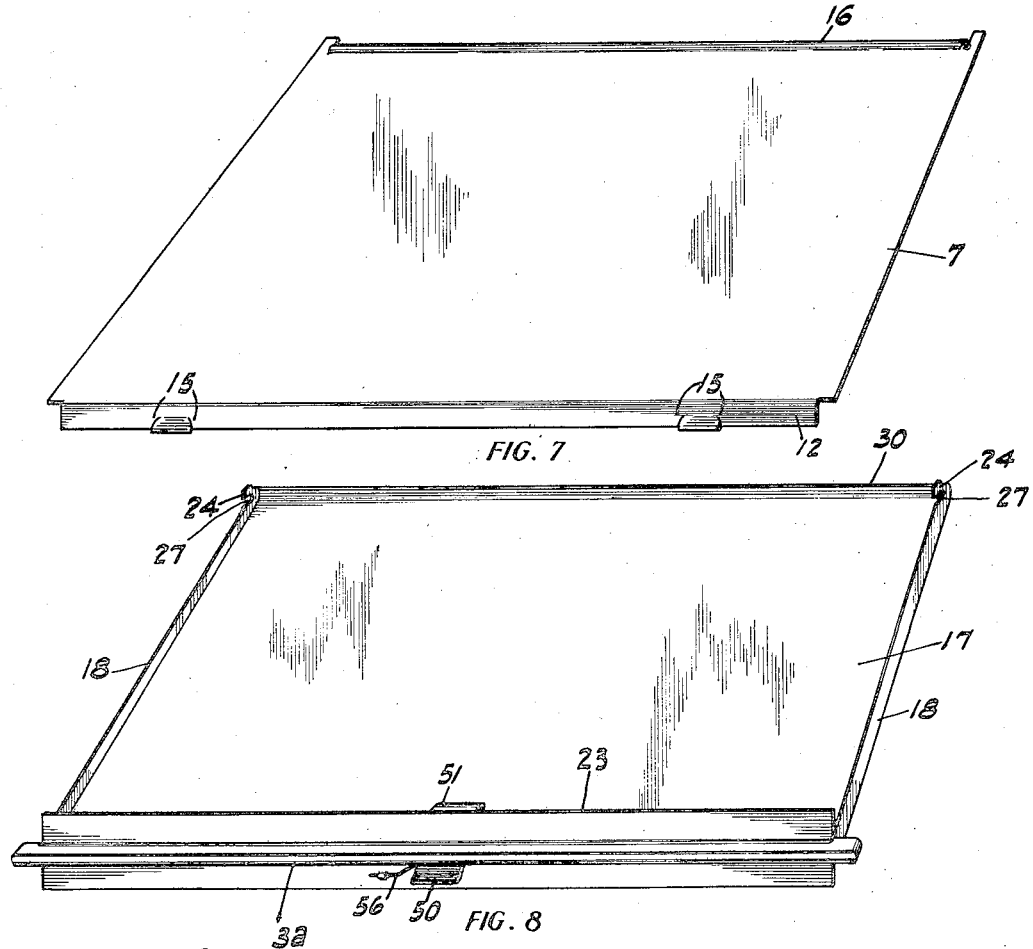
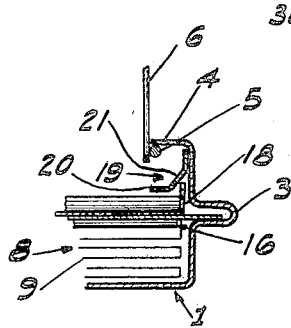
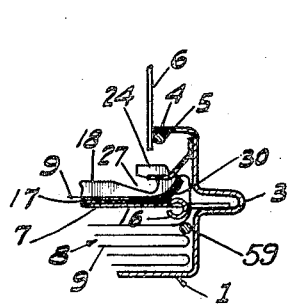
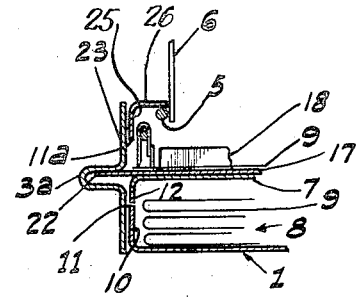
*INVENTOR*
*IRA T. SKILES*
BY
*ATTORNEY*

Patented Feb. 11, 1936

2,030,077

UNITED STATES PATENT OFFICE 2,030,077

REFUSE CATCHING AND REMOVING DEVICE FOR FLOORS

Ira T. Skiles, Pasadena, Calif.

Application January 30, 1933, Serial No. 654,134

21 Claims. (Cl. 119—17)

My invention relates to improvements in devices for catching and removing fecal droppings, in which a manually controlled gripper and a combination vertically reciprocating holder device operate in conjunction with a supply of folded paper or catch material; and the objects of my improvement are:

First.—To provide improved means whereby the bottoms of pens or devices which house pets, animals, insects, fowls, and especially bird life may be easily cleaned and kept sanitary.

Second.—To afford facilities for the installation of the improved supply pads of catch material.

Third.—To include an improved arrangement for the storage supply of a suitable sheet material to catch the droppings or refuse material.

Fourth.—To provide improved means for gripping the sheet material incident to removing soiled portions thereof.

Fifth.—To provide improved means whereby the soiled sheet material together with the excreta may be easily severed from the unsoiled material after the sheet material has been fed into the pen or cage.

Sixth.—To provide improved means for holding the sheet catch material in place after it is pulled into position to be used.

Seventh.—To provide improved means which on account of its handiness and time saving, will aid in the abatement of insects and will result in germ prevention, thereby preventing disease.

These objects are attained by mechanism shown in the accompanying drawings in which:

Fig. 3 is a fragmental plan view.

Fig. 4 is a front elevation, of the structure shown in Fig. 3, some parts being broken away to further show underlying structure.

Fig. 5 is a right hand side elevation of the device shown in Figures 3 and 4, some portions of which are omitted.

Fig. 6 is a fragmentary sectional perspective view taken on the line 6—6 of Fig. 1.

Fig. 7 is a perspective view of the false bottom separately shown.

Fig. 8 is a perspective view of the floor tray separately shown.

Fig. 9 is an enlarged fragmental section taken on line 9—9 of Fig. 1.

Fig. 10 is an enlarged fragmental section taken on line 10—10 of Fig. 1.

Fig. 11 is an enlarged fragmental section taken on line 11—11 of Fig. 3.

Figure 1:
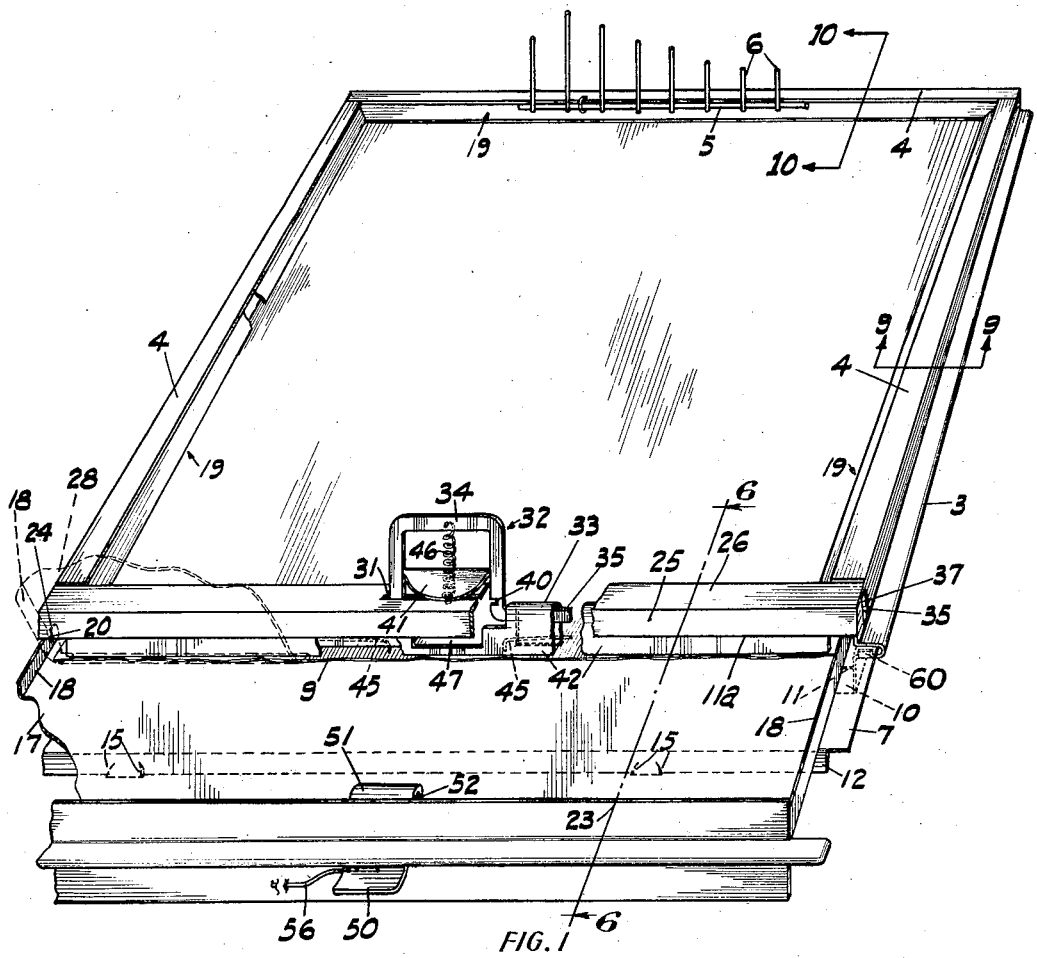
Fig. 1 is a perspective view of the improved fecal drop and cleaning arrangement as applied to a bird cage, only a fragmentary portion of the cage being shown, and some parts being partially extended and other parts broken away to disclose underlying structure.
Figure 2:
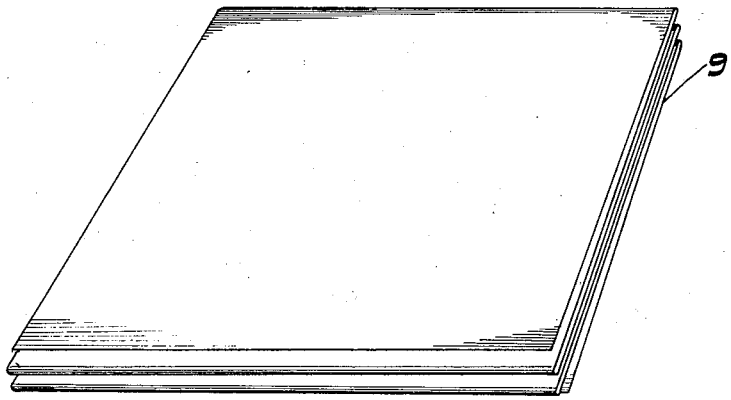
Fig. 2 is a perspective drawing showing the novel pad and the manner in which the catch material forming the pad is folded.

Referring now to the drawings, the invention comprises a cage bottom 1, having its side and rear end walls longitudinally bulged into U-shaped flanges 3, the upper walls forming these respective sides being provided with inturned flanges 4, adapted to be engaged with the base wire 5 of the cage structure 6.

The edge portions of the false bottom 7 are slidably supported between the limbs of the U-shaped flanges thus formed and cooperate with the lower portion of the cage bottom 1, to enclose a compartment 8 for the storage of the foldable catch material or pad of sheet material 9.

The lower portion of the front wall member 10 of the cage bottom 1 has the bulge portion removed, it being cut completely across the front along lines 11 and 11ª (Figures 1 and 6) adjacent the top and bottom fold of the bulge in order to provide a front opening whereby access may be had to the compartment 8 in order to replenish the supply pads 9 and provide space for the housing and operation of the movable parts consisting of the catch material, the false bottom 7, and the tray 17.

In order that the bulge effect may be pleasingly carried all around the cage bottom; there is welded or otherwise secured to the front edge portion of the tray 17, a front facing 23, which is constructed with a U-shaped bulge 3ª (see Fig. 5) similar to that of the sides and rear, and the front edge portion of the tray extends into the bulge and is secured to the top fold of the bulge as shown by the numeral 22 in Fig. 6 so that when the tray is completely housed within the cage the top and bottom sides of the facing abut the top and bottom portions of the front wall 10, and the bulge portion which projects to the right and left of the facing as shown in Fig. 8 abuts the ends of the side bulges in order to make it appear that the bulge is continuous all around the device.

The false bottom 7 has a downwardly directed lip 12, which, when the false bottom is fully inserted within the cage bottom 1, rests upon the edge of the lower portion of the front wall where it is cut at 11, so as to have the compartment 8 fully enclosed and also have the meeting edges, of the false bottom lip and front wall of the cage bottom, abut.

The lip 12 is cut away at each end thereby providing an edge portion of the false bottom which is adapted to be engaged by the upwardly directed flange 60, whereby the fixed position of the false bottom is maintained within the cage bottom. The lip 12 is cut at points 15 and the portion of the metal between these points is extended to form a finger hold, whereby the false bottom may be elevated above flanges 60 and withdrawn from its seat.

Since this extended hold occurs at a point adjacent where the front facing is bulged, it in no way can interfere with the proper abutting of the facing 23 with the top and bottom portion of the front wall 10.

The rear edge portion of the false bottom 7 is developed into a rounded effect 16 which is spaced slightly inwardly from the rear wall of the cage bottom thereby forming a guide.

The catch material composing the pad is directed over this rounded portion 16 from the compartment into the cage proper.

The catch material does not lie so compactly in the compartment 8 as to prevent its unfolding. It consists of a single sheet of material folded over and over again upon itself so as to occupy the entire depth of the compartment in which it is nested. This catch material will last several days and is for the purpose of catching all the excreta and refuse which may fall thereon.

The catch material is periodically removed and as it is being removed a new supply is being simultaneously fed into the cage from the compartment 8.

The catch material may if desired be specially prepared non-poisonous medicated paper, so as to prevent disease, or it may be suitably impregnated with a medicament which will aid in keeping away lice, mites, and germs, which are harmful to pets.

On the top side of the false bottom 7 is slidably mounted the tray 17. The upper and lower faces of this tray are smooth as is also the upper face of the false bottom, consequently there is little friction at their contacting surfaces.

The tray 17 is provided with upturned flanges 18 at its sides which operate beneath the guards 19 fastened to the upper portion of the side walls of the cage bottom 1.

The catch material occupies the full width of the tray between the upturned flanges and operates between the feet 20 of the guards and the tray, the guards having sloping sides 21 which direct falling food particles onto the catch material and also prevent the refuse from entering other parts of the cage bottom.

The rear ends of the flanges 18, are developed into hooks 24. Said hooks engage the inside face of the upper portion of the front wall 10 when the tray is completely extended to prevent it from being completely withdrawn when in the horizontal position, or from accidentally falling from the cage bottom.

At times it is desired to completely withdraw the tray from the cage bottom, as for instance when it is desired to install a new pad of catch material. Hence there are provided notches 27, spaced forwardly of the hooks, so that the tray may be tilted upwardly with respect to the upper portion of the front wall and then be disengaged as taught by the dottedly shown portion 28 in Fig. 1.

The extreme end portions of the flanges 18, which lie rearwardly of the hooks 24 are rounded and the body edge portion 30 of the tray is contoured to the same outline. This contoured body portion of the tray, like the upturned flanges 18 and the guards 19, further aids in keeping the refuse on the catch material within the tray.

The horizontal inturned flange 26 of the upper front wall member 10 forming the cage bottom 1, is provided with a slotted aperture 31 (Fig. 6). Within said aperture is mounted the lift 32. The lift serves as a support for the combination holding device 33.

The lift comprises a handle portion 34 of substantially a U-shape having outwardly directed tapering limbs 35 and 36, the ends of which are slidably mounted in slots or apertures 37 (Figs. 1 and 4) cut in the forward upper portion of the side walls forming the cage bottom.

The aperture 31 is of sufficient width to permit the lift 32 to be slightly shifted toward the left as it is elevated, and the limbs 35 and 36 are made sufficiently long and yieldable to permit them to always play in the slots 37 when the lift is shifted.

The lift is mounted within the aperture 31 and after it is inserted therein, there is welded in the aperture a bridge 38 which spans said aperture.

The right and left vertical members forming the handle portion of the lift are provided respectively with notches 39 and 40, so that when the lift is elevated and slightly shifted toward the left the notch 39 will engage the left edge of the aperture 31 and the slot 40 will engage an edge of the bridge 38, said bridge spanning the aperture adjacent to the right vertical member of the handle portion to always insure the engagement of the slot with the bridge.

A portion of the stock forming the handle portion 34 may be developed into a finger grip 41.

The combination holding device 33 is fastened to the outwardly directed limbs 35 and 36 of the lift 32. It is U-shaped in cross-section and the forward member 42 of the U, which slidably abuts the rear face of the upper front wall 25, has its lower portion developed into a straight edge 43 which grips the paper whereby an attendant may sever the soiled portion of the catch material from the unsoiled portion by manually lifting the extending fold.

The combination holding device extends completely across the cage and there is provided slight clearance at each end between the face of the rear member 44 of the U-portion and the upturned flanges 18 of the tray to permit of easy operation of the parts 32 and 33.

The rear member 44 has a part of its central portion removed in order to accommodate assembling the parts 32 and 33. To said rear member 44 I mount, by slotting or otherwise fastening, strippers 45. These strippers are spring seated and their ends are pointed and turned downwardly so as to pierce the catch material in order that the same be not displaced by the sliding movement of the tray.

To forestall any interference of the lower edge portion of the parts 44 with the operation of the catch material, I cut away the lower portions of said parts an appreciable distance above the points of the strippers as clearly shown in Fig. 6.

When the lift is elevated and secured in the notches 39 and 40, the strippers are sufficiently elevated to free their points from catching on the catch paper as it is being withdrawn from the cage.

In order that the catch material be in no way displaced, the straight edge portion of the holder is firmly held against the catch material by means of the tensioned spring 46. Said spring has one of its ends fastened to the inturned flange 26 of the stationary uppermost frame member and the other end is fastened to the top cross member of the movable lift.

The cut away portion at the center of the rear member 44 extends over the crest of the U-portion and part way into the forward member 42 where it is developed into a slot 47.

Directly in front of the slot 47, in the part 17 is provided an aperture 48, and mounted in said aperture is the gripper 49. Said gripper has one limb 50 which extends through the aperture and is manually accessible exteriorly of the front facing, and another limb 51 provided with a gripping element 52 which extends through the slot 47 so as to engage with a portion of the forward member 42 comprising the holder.

The gripper is pivotally mounted upon the front facing, there being a shaft 53 fastened to the back side of the gripper, said shaft being journalled in bearings 54 and 55 fastened within the bulged portion of the facing.

There is a spring wire 56 fastened to the outside face of the front facing which acts against the underside of the limb 50 tending to force the limb 51 and the gripping element downwardly.

The gripping element 52 has a two-fold function. It extends over the member 42 to prevent the tray from sliding outwardly. When it is desired to clean the cage, the gripping element is rotated to be withdrawn from the slot and the lift is elevated and shifted so that the slots 39 and 40 engage the frame, whereupon the gripping element is released and it grips the catch material. With the gripping element gripping the catch material the tray is withdrawn until the lugs abut the inside face of the front wall during which operation the soiled catch marterial will have been withdrawn from the cage. The tray 17 together with the lower floor member 7 may be termed a double false bottom which normally occupies the space between the two upper folds of the catch material, the upper portion of said false bottom being provided with the part which withdraws the soiled catch material.

In the meantime a fresh supply of catch material has been fed into the cage, the guide or guard member 59, consisting of a spring wire mounted transversely of the cage holding the catch material in place while the operation of cleaning is taking place. The lift is then lowered, the points of the strippers and the straight edge engaging a fresh portion of the catch material, in readiness to be withdrawn around the guide 16 when the tray or floor member 17 is again pulled out. The soiled portion is folded or rolled together and then torn along the line where the straight edge bears against it. After this has been done the tray is inserted and the gripping element again locks it in normal position.

I claim:

1. In combination, a slidable tray adapted to be manually reciprocated, a continuous sheet having a plurality of folds which overlie each other and withdrawable one at a time to form a covering for said tray, the uppermost fold of said sheet having a free edge which is accessible at one edge of said tray, and a yielding retractable straight-edge stationed at that edge of said tray in position to have said upper fold of the sheet extended thereunder and then thereby severed from the remainder of the sheet by manually lifting said extended fold after said tray has been moved forwardly together with said fold, thereby placing said fold in a position to be severed.

2. In combination, a slidable tray, a continuous sheet having a plurality of folds overlying each other and when extended forming a covering for said tray, the uppermost fold of said sheet having a free edge which is accessible at one edge of said tray and withdrawable therewith, and a detachable false bottom upon which said tray slides, said tray and said detachable false bottom forming a double false bottom and normally occupying the space between the two upper folds of said sheet.

3. In combination, a slidable tray, a continuous sheet having a plurality of folds which overlie each other, said tray occupying the space between the two upper folds of said sheet, and the uppermost fold of said sheet forming a covering for said tray, a detachable false bottom normally occupying the space between said tray and the lowermost sheet of said upper folds, the uppermost fold of said sheet having a free edge which is accessible at one edge of said tray, and a straight-edge stationed at that edge of said tray in position to have said upper fold of the sheet extended thereunder and then thereby severed from the remainder of the sheet by manually lifting said extended fold.

4. In a device of the kind described, a floor member, an elongated sheet of material folded into sections mounted adjacent said floor member to be fed thereacross one section at a time, a horizontally extending straight-edge mounted above said floor member whereby an extended section of the sheet may be severed from the remainder thereof, a support for said straight-edge, said straight-edge being manually liftable and shiftable upon said support thereby to be sustained in spaced relation to said floor member while a section of the sheet is being fed between said straight-edge and said floor member and yieldable means acting in opposition to the lifting of said straight-edge, the edge of said straight-edge normally gripping said sheet between it and said floor member.

5. The combination with a cage bottom, of a false bottom cooperating with said cage bottom to form therewith a compartment, a pad of catch material having a plurality of folds foldable over upon themselves nested in said compartment, a tray slidably mounted on said false bottom, said catch material on leaving said compartment being directed over the rear portions of said false bottom and said tray, and thence over the top face of said tray, a lift, the side walls of said cage bottom having oppositely disposed apertures thus providing a guiding means for the end portions of said lift, a combination holding device mounted on said lift, and a spring to cause said holding device to bear against the material between said holding device and the tray, said holding device being manually liftable against the opposition of said spring.

6. The combination with a cage bottom, of a detachable false bottom cooperating with said cage bottom to form therewith a compartment, a tray slidably mounted upon said false bottom, a lift, the side walls of said false bottom being provided with a guiding means for the end portions of said lift, a combination straight-edge and holder mounted on said lift, tensioning means depressing said straight-edge and holder, said straight-edge having a downwardly directed edge portion, and a pad of catch material having a plurality of folds foldable over upon themselves nested in said compartment, said folds being directed over the rear portion of said false bottom and said tray and thence over the top of said tray into holding engagement with said straight-edge holder.

7. In a device of the kind described, a floor member, an elongated sheet of material folded in layers mounted adjacent said floor member to be fed thereacross one layer at a time, a horizontally extending straight-edge mounted above said floor member, whereby an extended layer of the sheet may be disjoined from the remainder thereof, means to temporarily support said straight-edge in an elevated position above said floor member, said straight-edge being manually liftable upon said support, and a yieldable holder carried by the straight-edge structure adapted to engage the sheet.

8. The subject matter of claim 7 and, said holder including a spring arm having a downwardly directed portion engageable with the sheet.

9. In a device of the kind described, a cage having a storage compartment therebeneath, a tray horizontally disposed above said compartment, means to slidably support said tray, an elongated sheet of material folded into layers stored in said compartment and having a free end portion overlying said tray, means carried by said tray to grip that end portion of said sheet preparatory to withdrawing a layer of said sheet by sliding said tray outwardly and means to limit the outward movement of said tray.

10. The subject matter of claim 9 and, said tray at the limit of its outward sliding movement being tiltable into a position wherein said means for limiting its outward movement becomes inoperative and the tray as a whole becomes detachable.

11. In combination, a cage having a bottom provided with outwardly directed guide portions along opposite sides, a detachable false bottom structure having side edges slidable within said guides, a detachable tray having upturned side edges slidable upon said false bottom, an extensible sheet having a free end portion which overlies said tray and withdrawable therewith, and guards overhanging the upturned side edge portions of said tray to direct the droppings on to said sheet.

12. In combination, a cage bottom having bulged sides, a detachable false bottom and a tray slidable thereon forming a double false bottom, the bulged sides of said cage bottom forming a slide seat for said detachable false bottom, said detachable double false bottom cooperating with said cage bottom to form a compartment, an elongated continuous sheet of paper reversely folded in horizontal layers forming a pad and occupying said compartment, each fold when extended forming a cover for said tray, said tray and said detachable false bottom being nested between the two uppermost folds of said pad, the uppermost fold of said sheet having a free edge which is accessible at one edge of said tray, a guide extending along the edge of said detachable false bottom which is opposite the free edge of said sheet, and means engageable with said pad whereby one fold at a time is released around said guide, the upper layer of said pad being continuously withdrawable around said guide, and a straight-edge stationed at the first recited edge of said tray in position to have the upper fold of the sheet withdrawn thereunder and thereafter severed by manually lifting the withdrawn portion of the sheet.

13. In a device of the kind described, a slidable tray provided with a grip, a continuous sheet having a plurality of folds which overlie each other and one fold at a time forming an extendable covering for said tray, the uppermost fold of said sheet having a free edge grippable by said grip at one edge of said tray, and a straight-edge stationed at that edge of said tray in position to be retracted whereby said sheet together with said tray may be extended thereunder, and means cooperating with said straight-edge when the latter is released to clamp it with said sheet.

14. The combination with a cage bottom having bulged sides forming a slide seat; of a false bottom slidably mounted on said seat and cooperating with said cage bottom to form a compartment, a tray slidably mounted upon said false bottom, an elongated continuous sheet of paper reversely folded into horizontal layers forming a pad and each layer occupying substantially the entire area of said compartment, means engageable with the free edge of the uppermost layer of said pad whereby one layer at a time is withdrawn from said compartment, a horizontally extending straight-edge mounted above said tray whereby an extended layer may be manually severed from the remainder thereof, means to raise said straight-edge and support it in spaced relation to said tray while a layer of the pad is being fed between said straight-edge and said tray, said straight-edge being grippable with a layer of said pad, and means carried by the body portion of the straight-edge and engageable with a layer of said pad whereby to maintain an extended layer of the pad in position to be gripped by said straight-edge.

15. In a device of the kind described, a cage bottom, an elongated continuous sheet of paper folded into horizontal layers forming a pad, and each layer occupying substantially the entire area of said bottom, and means comprising a slidable part extending between the two uppermost layers of said pad.

16. In a device of the kind described, a cage having a storage compartment therebeneath, an elongated continuous sheet of paper folded into horizontal layers forming a pad, and each layer occupying substantially the entire area of said compartment, and parts comprising a double false bottom extending between the two uppermost layers of said sheet, said parts being slidable one upon the other and each being detachable.

17. In a device of the kind described, a cage having a storage compartment therebeneath, an elongated continuous sheet of paper folded into horizontal layers forming a pad, and each layer occupying substantially the entire area of said compartment, and parts comprising a double false bottom extending between the two uppermost layers of said sheet, said parts being slidable one upon the other and each being detachable, said sheet having a free end portion overlying said slidable part and means carried by the cage structure adapted to engage the sheet to maintain the uppermost layer of the sheet in extended position after an unsoiled portion has been disjoined from the remainder of said pad.

18. A cage provided with a double false bottom including a slidable tray and having a storage compartment therebeneath, and an elongated continuous sheet of paper folded into horizontal layers forming a pad, and each layer occupying substantially the entire area of said compartment, said false bottom occupying the space between the first and second layers of said sheet.

19. A cage provided with a double false bottom including a slidable tray and having a storage compartment therebeneath, an elongated continuous sheet of paper folded into horizontal layers forming a pad, and each layer occupying substantially the entire area of said compartment, said false bottom occupying the space between the first and second layers of said sheet, said sheet having a free end portion overlying said tray, and means carried by said tray to grip that end portion of said sheet incident to withdrawing said tray for the purpose of withdrawing another section of said sheet from said compartment.

20. The combination with an inclosure for housing a bird; of an inclosure bottom providing a storage compartment therebeneath, a sheet folded into horizontal folds forming a pad, and each fold occupying substantially the entire area of said compartment, and a movable member and a stationary member occupying the space between the two upper folds of the sheet, said movable member being detachable and extensible from said bottom and provided with means to, upon being extended, withdraw one fold and extend another in its place.

21. The combination with an inclosure for housing a bird; of an inclosure bottom providing a storage compartment therebeneath, a sheet folded into horizontal folds forming a pad, and each fold occupying substantially the entire area of said compartment, a movable member and a stationary member occupying the space between the two upper folds of the sheet, said movable member being detachable and extensible from said bottom and provided with means to, upon being extended, withdraw one fold and extend another in its place, and means to retain the position of the newly extended fold during the reinserting of said movable member between the folds of the sheet.

IRA T. SKILES.